United States Patent [19]
Kim

[11] Patent Number: 5,716,109
[45] Date of Patent: Feb. 10, 1998

[54] LOAD CONSCIOUS REDUCING VALVE SYSTEM

[75] Inventor: Jinkak Kim, Kyungsangnam-do, Rep. of Korea

[73] Assignee: Hyundai Motor Company, Seoul, Rep. of Korea

[21] Appl. No.: 536,966

[22] Filed: Sep. 29, 1995

[30] Foreign Application Priority Data

Sep. 30, 1994 [KR] Rep. of Korea .................. 94-25626 U

[51] Int. Cl.⁶ .................................................. B60T 8/30
[52] U.S. Cl. ........................ 303/9.69; 303/9.75; 303/22.8; 188/195
[58] Field of Search ......................... 303/9, 9.63, 9.69, 303/9.71, 9.72, 9.73, 9.75, 22.4, 22.5, 22.7, 22.8, 84.1, 84.2; 188/195, 349, 151 A

[56] References Cited

U.S. PATENT DOCUMENTS

| | | | |
|---|---|---|---|
| 3,163,473 | 12/1964 | Stelzer | 303/9.74 |
| 4,180,295 | 12/1979 | Takeshita et al. | 303/22.4 |
| 4,243,272 | 1/1981 | Young | 188/195 X |
| 4,268,092 | 5/1981 | Young | 303/22.7 |
| 4,583,789 | 4/1986 | Schenten | 303/9.75 |

FOREIGN PATENT DOCUMENTS 62-255263  11/1987  Japan .

*Primary Examiner*—Josie Ballato
*Attorney, Agent, or Firm*—Finnegan, Henderson, Farabow, Garrett & Dunner, L.L.P.

[57] ABSTRACT

The present device is a rear brake pressure reducing system which responds to changes in weight and weight distribution of a vehicle. It has a valve connected to the vehicle's axle by pivotally connected linkages, a bell crank, a sensing spring, and a piston actuating lever. The valve has a bypass duct which provides full hydraulic pressure to the rear brakes in the event the front brake fails.

10 Claims, 2 Drawing Sheets

LOAD CONSCIOUS REDUCING VALVE SYSTEM

BACKGROUND OF THE INVENTION

1) Field of the Invention

The present invention relates to a load conscious reducing valve system of a brake. More particularly, it relates to the load conscious reducing valve system controlling a hydraulic pressure of a rear brake according to a change of position between a vehicle chassis and a rear axle caused by a loading condition of the vehicle.

2) Description of the Related Art

A brake system is one of the most important safety systems on the vehicles. The ability of the brake system to bring a vehicle to a safe controlled stop is absolutely essential in preventing accidental vehicle damage, personal injury, and loss of life.

Particularly, a load conscious reducing valve system includes a braking force regulator with shut-off device, which is applied to a rear brake system of a large-sized vehicle with relatively large load, and regulates the brake force of the rear wheel according to the loading condition of the vehicle. The load conscious reducing valve system applies a hydraulic pressure generated from a master cylinder to the rear wheel brake circuit through a by-pass when the front wheel brake circuit is disabled.

The load conscious reducing valve system prevents the rear wheel from locking or blocking, and generates a smooth braking force by transmitting the appropriate amount of hydraulic pressure to the rear wheel, by sensing an unloaded state, a loaded state, or a weight transfer.

A hydraulic pressure reducing system of a load conscious type brake is disclosed in Japanese Patent Publication No. 87-255263. In that load conscious type reducing valve system, a load sensing spring is mounted and a preload is applied to said load sensing spring when first installed, so that when the load sensing spring is a tension coil spring, the spring is prevented from loosening even in the unloaded state. However, the problem with the system described above is that it cannot effectively deal with a disabled front brake, since no bypass means for the hydraulic fluid are supplied.

The present invention solves the problems of the load conscious reducing valve system for brakes like the one described above. The object of the present invention is to provide a load conscious reducing valve system for the brake which has simple structure, but can effectively compensate for the unloading due to the stance of the vehicle, or to the geometrical unloading due to vibration or shaking, and can effectively deal with the problem of the front brake being out of order.

SUMMARY OF THE INVENTION

To achieve the above object, the preferred embodiment of the present invention provides a load conscious reducing system of a rear brake comprising a valve for controlling hydraulic pressure, a first connecting link having one end fixed to a rear axle housing, a second connecting link having one end pivotally connected with the other end of the first connecting link, a bell crank pivotally connected to a body of the load conscious reducing valve, and means for controlling the operation of the lever in response to a movement of the first and second connecting link and of the bell crank.

The load conscious reducing valve comprises a first passage connected to the rear brake portion, a second passage connected to the master cylinder portion, means for controlling the hydraulic pressure transmitted between the first and second passage according to the operation of the lever, a passage for by-pass connecting the first and second passages, and means for selectively opening and closing the passage for by-pass according to the presence of hydraulic pressure from the front brake portion.

The means for controlling the hydraulic pressure comprise a piston reciprocating according to a biasing of the lever and a seal for regulating a size of a fluid passage between seal and piston, according to the reciprocating motion of the piston.

The means for opening and closing the by-pass comprise an elastic member elastically supporting a second piston. When hydraulic pressure is not applied by the front brake portion due to the front brake being out of order, the elastic member moves the second piston and the by-pass opens, so that hydraulic pressure is supplied to the first passage from the second passage via the by-pass. When hydraulic pressure is applied by the front brake portion, the pressure on the piston overcomes the elastic member and closes the by-pass, so that hydraulic pressure is transmitted to the rear brake via the first passage that is controlled by the means for controlling the hydraulic pressure, according to the load applied to the vehicle body.

The means for controlling the operation of the lever that is connected to the bell crank includes a sensing spring.

In another embodiment, the present invention is directed to a load conscious reducing valve of the rear brake comprising a first passage connected with the rear brake portion, a second passage connected with the master cylinder portion, means for controlling the hydraulic pressure connecting the first and second passage and for controlling the hydraulic pressure supplied from the master cylinder to the rear brake, a passage for by-pass directly connecting the first and second passage, and means for selectively opening and closing the by-pass passage.

The means for controlling the hydraulic pressure comprise a lever operating according to the load applied to the vehicle, a piston reciprocating according to the operation of the lever, and a seal regulating the size of a communicating clearance between the first and second passage according to the reciprocating motion of the piston.

The means for opening and closing the by-pass comprise a piston and an elastic member elastically supporting the piston. When the hydraulic pressure is not applied from the front brake portion due to the front brake being out of order, the hydraulic pressure is supplied from the second passage directly to the first passage, since the passage for by-pass is opened by the elastic member displacing the piston. When the hydraulic pressure is applied from the front brake portion, the passage for by-pass is closed by the hydraulic pressure on the piston overcoming the elasticity of the elastic member, and hydraulic pressure is transmitted to the rear brake via the first passage, where it is controlled by the means for controlling the hydraulic pressure according to the load applied to the vehicle body.

BRIEF DESCRIPTION OF THE DRAWINGS

Further advantages and other objects of the present invention will be apparent in the following detailed description in connection with the accompanying drawings, in which.

DETAILED DESCRIPTION OF THE PREFERRED EMBODIMENT

Reference will now be made in detail to the present preferred embodiment of the invention, an example of which is illustrated in the accompanying drawings. Wherever possible, the same reference numbers will be designated throughout the drawings to refer to the same or like parts.

Figure 1:
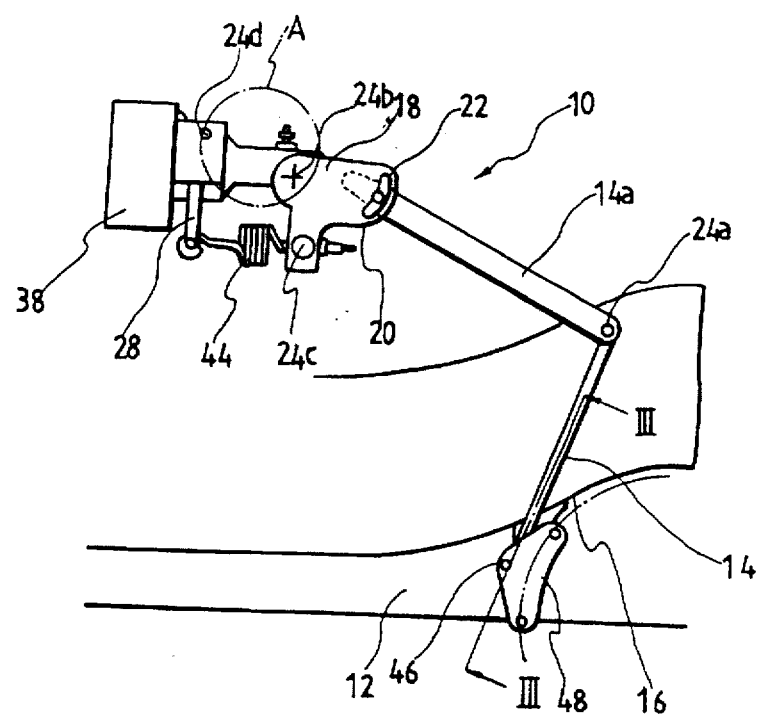
FIG. 1 is an elevation view showing a load conscious reducing valve system of a brake, according to a preferred embodiment of the present invention.
Figure 2:
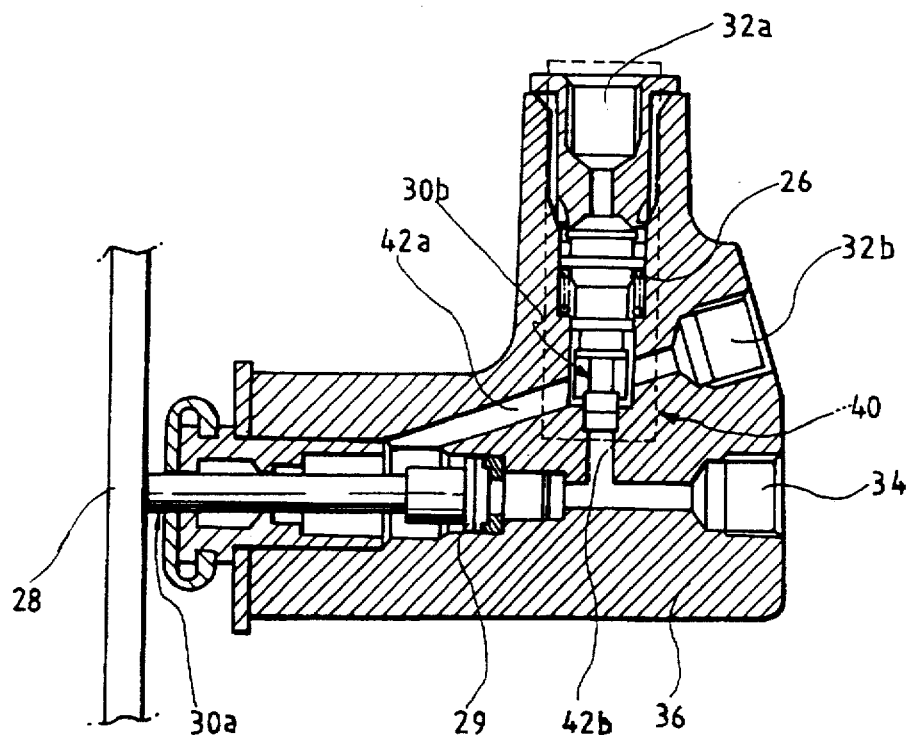
FIG. 2 is an enlarged elevation sectional view of the area within circle A in FIG. 1, showing the load conscious reducing valve according to the preferred embodiment of the present invention.

FIG. 1 is an elevation view showing a structure of a load conscious reducing valve system of a brake according to a preferred embodiment of the present invention. FIG. 2 is an enlarged elevation sectional view showing the structure of the load conscious reducing valve system of the brake. The load conscious reducing valve system 10, according to the present invention, comprises connecting links 14 and 14a, a bell crank 18 and a lever 28.

Figure 3:
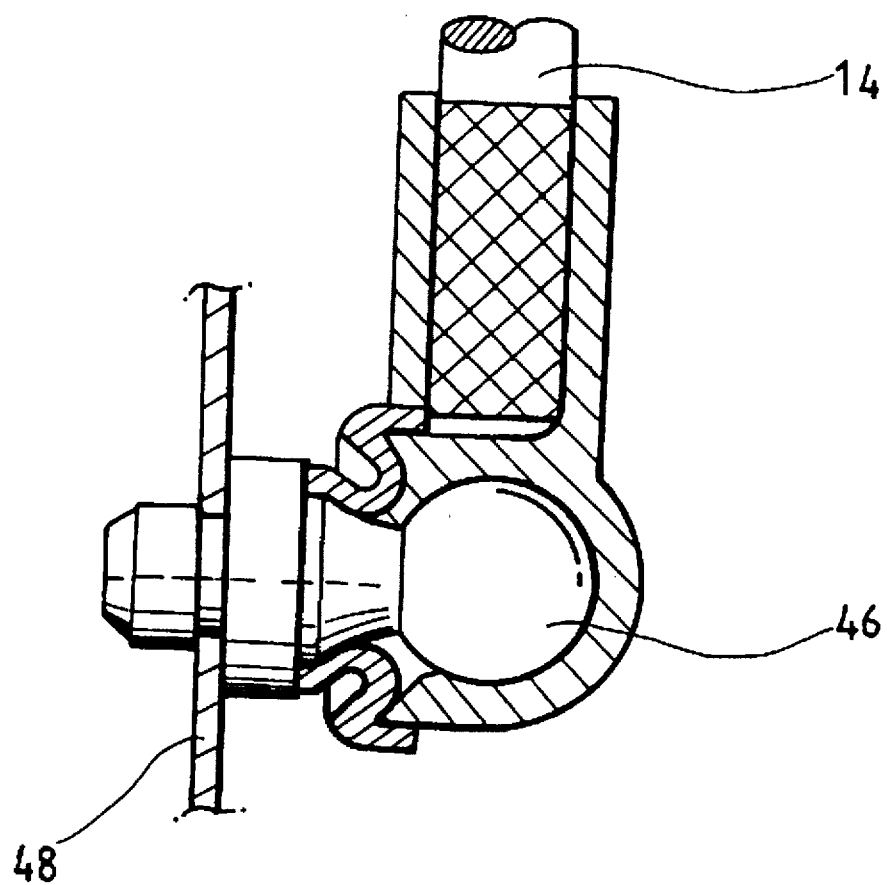
FIG. 3 is a sectional view cut along a line III-III showing a ball joint portion of the load conscious reducing valve system connecting a bracket mounted to a rear axle to a first connecting link, according to the preferred embodiment of the present invention.

One end of the connecting link 14 and one end of the connecting link 14a are pivotally connected to each other by hinge coupling 24a. The other end of the connecting link 14 is connected to a rear axle housing 16 by a ball joint 46, secured to bracket 48, which in turn is mounted on the rear axle 12 and on the rear axle housing 16, as shown in FIG. 3. When a ball joint 46 is used to connect the other end of the connecting link 14 to the rear axle housing 16, a change in loading due to vibrations or to the shaking of the vehicle can be accounted for more effectively that if the connecting link 14 is simply connected to the axle according to a conventional method.

The other end of the connecting link 14a is connected with the bell crank 18 by a projecting pin 22 extending from the end portion of the link 14a, and being inserted in a slot 20 formed on the bell crank 18. A loading change due to the stance of the vehicle can be effectively accounted for, since it is possible to control the angle of the connecting link 14a by adjusting the connection of the connecting link 14a to the bell crank 18.

The slot 20 provides a means for confirming the change in loading by monitoring the position of the connecting link 14a along the path of the slot 20, when the suspension geometry of the vehicle is changed.

The bell crank 18 is pivotally fixed on one side wall of a valve body 36 by an axle 24b. The valve body is secured to a body frame 38. One end of a sensing spring 44 is fixed to a position adjacent to the lower part of the bell crank 18 by an axle 24c. The other end of the sensing spring 44 is fixed to the lower part of the lever 28. The connection of the lever 28 and the bell crank 18 is such that it reduces the error in actuating the lever 28 more effectively than a connection according to the conventional art. The upper portion of the lever 28 is pivotally fixed on the valve body 36 by an axle 24d and acts on a piston 39a provided in the valve body, as shown in FIG. 2.

Referring to FIG. 2, reference number 30b shows another piston provided in an inlet port 32a connected to a front brake line portion of the valve body 36. Reference number 26 shows a spring for biasing upwardly the piston 30b.

In normal operation hydraulic pressure is applied to the inflow port 32a connected to the front brake line portion, and piston 30b closes a passage for by-pass 42b because the pressure acting on piston 30b overcomes the spring force. Accordingly, the hydraulic pressure flowing through the inflow port 32b portion connected with a master cylinder (not shown) is applied to a rear brake portion through a exhaust port 34 via a passage 42a. In this condition, the strength of the hydraulic pressure is controlled by changing a clearance between a fixed seal 29 and the sliding piston 30a, according to the piston positioning which is controlled by the lever 28. In turn, lever 28 is actuated upon by link 14a, link 14, bell crank 18, and sensing spring 44, in response to the load applied to the vehicle. A braking force of a rear wheel can therefore be smoothly controlled by controlling the strength of the hydraulic pressure actuating the rear wheel brake, according to the above described pressure control system responsive to loading changes.

When the front braking system is out of order, the hydraulic pressure applied to the piston 30b is removed since no hydraulic pressure from the front brake is transmitted to the inflow port 32a. In this condition, the by-pass passage 42b becomes connected with passage 32b because the piston 30b is moved upward by spring 26, and no longer closes the passage for by-pass 42b. Accordingly, the hydraulic pressure flowing through the inflow port 32b from the master cylinder is directed to the rear wheel brake through the connecting port 42b and the outlet 34. Therefore, even the rear brake alone can control the braking force of the vehicle to minimize the possibilities of an accident due to a disabled front brake, since the hydraulic pressure can be applied directly to the rear brake when the braking force is not applied to the front wheel due to the breakdown of the front brake.

According to the present invention, the change in loading due to the stance of the vehicle can be accounted for by connecting the bell crank to the connecting link using the slot and pin connection according to the above description. Further, an error due to the load sensing system can be reduced by connecting the bell crank and the lever by the sensing spring. The change in loading on the axles of the suspension geometry due to the vibration or shaking of the vehicle can be accounted for by connecting the connecting link with the rear axle housing using the ball joint. In addition, the system according to the present invention can deal with the problem of the front brake being out of order, since means for by-passing the valve are supplied.

Although only a preferred embodiment and select modifications of the invention have been disclosed and described, it is apparent that other embodiments and modifications of the invention are possible within the scope of the appended claims.

What is claimed is:

1. A load conscious reducing system of a rear brake comprising:

a valve for controlling a hydraulic pressure;

a first connecting link having opposed ends, one end being attached to a rear axle housing;

a bell crank pivotally connected to the valve;

a second connecting link having opposed ends, one end being pivotally connected to the other end of said first connecting link, and the other end of the second connecting link being attached to the bell crank;

a lever pivotally attached to said valve for controlling the operation of said valve; and means for controlling said lever in response to a movement of said first and second connecting link and said bell crank.

2. The system according to claim 1, wherein said valve comprises;

a first passage connected with the rear brake portion;

a second passage connected to a master cylinder portion;

means for controlling the hydraulic pressure transmitted between said first and second passages according to the operation of the lever;

a passage for by-pass connecting said first and second passages; and means for selectively opening and closing said passage for by-pass in response to the presence of hydraulic pressure from a front brake portion.

3. The system according to claim 2, wherein said means for controlling the hydraulic pressure comprise:

a reciprocating piston for moving according to a biasing of said lever; and a seal cooperating with said reciprocating piston to adjust the size of a fluid passage formed between said reciprocating piston and said seal, according to the motion of said reciprocating piston.

4. The system according to claim 2, wherein said means for opening and closing the by-pass passage comprise:

an inlet passage connected to a front brake portion;

a piston disposed in said inlet passage for sliding within said inlet passage and for sealing the duct for by-pass when placed in a sealing position; and an elastic member elastically supporting said piston for biasing the piston opposite to the sealing position, so that when hydraulic pressure is not applied to the piston from the front brake portion due to disabling of the front brake, said elastic member biases the piston away from the sealing position to unseal the by-pass passage and to supply hydraulic pressure to the first passage from the second passage via the passage for by-pass, but when the hydraulic pressure is applied to the piston from the front brake portion, the hydraulic pressure overcomes the biasing of the elastic member to move the piston to the sealing position, and hydraulic pressure is transmitted to the rear brake via said means for controlling the hydraulic pressure according to the operation of the lever.

5. The system according to claim 1, wherein one end portion of said first connecting link and said rear axle housing are connected to each other by a ball joint.

6. The system according to claim 1, wherein a means for controlling the operation of the lever includes connecting said bell crank to said lever with a sensing spring.

7. The system according to claim 1, wherein the bell crank includes a slot for receiving a projecting pin extending from the other end of said second connecting link, so that the projecting pin slides along said slot.

8. A load conscious reducing valve system of a rear brake comprising:

a first passage connected to a rear brake portion;

a second passage connected with a master cylinder portion;

means for controlling an hydraulic pressure supplied from a master cylinder to a rear brake portion;

a passage for by-pass directly connecting said first and second passage; and means for selectively opening and closing said passage for by-pass.

9. The system according to claim 8, wherein the means for controlling the hydraulic pressure comprise:

a lever operating according to a load applied to a vehicle;

a reciprocating piston for moving according to the operation of said lever; and a seal cooperating with said reciprocating piston to adjust a size of a fluid passage formed between said reciprocating piston and said seal, according to the motion of said reciprocating piston.

10. The system according to claim 8, wherein the means for opening and closing the by-pass passage comprise:

a piston disposed in said inlet passage for sliding within said inlet passage and for sealing the duct for by-pass when in a sealing position; and an elastic member elastically supporting said piston for biasing the piston opposite to the sealing position, so that when the hydraulic pressure is not applied to the piston from the front brake portion due to disabling of the front brake, the elastic member biases the piston away from the sealing position to unseal the by-pass passage and to supply hydraulic pressure from said second passage to said first passage via said passage for by-pass, but when the hydraulic pressure is applied to the piston from the front brake portion, the hydraulic pressure overcomes the biasing of the elastic member to move the piston to the sealing position, and hydraulic pressure is transmitted to the rear brake via said means for controlling the hydraulic pressure according to the load applied to the vehicle body.

* * * * *